US008376298B2

(12) United States Patent (10) Patent No.: US 8,376,298 B2
McPheeters (45) Date of Patent: Feb. 19, 2013

(54) UNIVERSAL END CLAMP

(75) Inventor: Greg McPheeters, Santa Clara, CA (US)

(73) Assignee: Mainstream Energy Corporation, San Luis Obispo, CA (US)

( * ) Notice: Subject to any disclaimer, the term of this patent is extended or adjusted under 35 U.S.C. 154(b) by 0 days.

(21) Appl. No.: 13/196,183

(22) Filed: Aug. 2, 2011

(65) Prior Publication Data

US 2011/0284708 A1 Nov. 24, 2011

Related U.S. Application Data

(62) Division of application No. 12/470,682, filed on May 22, 2009.

(60) Provisional application No. 61/071,891, filed on May 22, 2008.

(51) Int. Cl.
 *A47B 96/06* (2006.01)
(52) U.S. Cl. ............... 248/231.41; 248/72; 248/231.31; 248/228.1; 52/710; 52/173.3; 411/80; 136/244
(58) Field of Classification Search ............... 248/228.2, 248/230.2, 231.31, 316.2, 229.11, 229.21, 248/222.13, 228.3, 228.1, 231.41, 227.1, 248/227.2, 316.4, 72; 52/173.1, 698, 282.5, 52/710, 173.3; 411/84, 75, 79, 80; 136/244, 136/251
See application file for complete search history.

(56) References Cited

U.S. PATENT DOCUMENTS

| | | | |
|---|---|---|---|
| 276,135 A | 4/1883 | Cooley | |
| 741,747 A | 10/1903 | Walz | |
| 1,316,084 A | 9/1919 | Dake | |
| 1,568,122 A | 1/1926 | Zifferer | 248/228.2 |
| 1,608,592 A | 11/1926 | Funk | 446/126 |
| 1,616,232 A | 2/1927 | Roberts et al. | |
| 1,724,394 A | 8/1929 | Chamberlain | |
| 2,182,480 A | 12/1939 | Lowry | |
| 2,253,241 A | 8/1941 | MacDonald | |
| 2,345,650 A | 4/1944 | Attwood | 403/21 |
| 2,380,379 A | 7/1945 | Attwood | 248/163.1 |
| 2,429,833 A | 10/1947 | Luce | |
| 2,676,680 A | 4/1954 | Kindorf | |
| 2,696,139 A | 12/1954 | Attwood | 411/427 |
| 2,741,289 A | 4/1956 | Grow | |
| 2,833,326 A | 5/1958 | Karl | |
| 2,928,512 A | 3/1960 | Slater et al. | 403/22 |
| 2,944,642 A | 7/1960 | Evans | |
| 3,019,887 A | 2/1962 | Lowden | |
| 3,043,408 A | 7/1962 | Attwood | 52/842 |
| 3,056,443 A | 10/1962 | Knocke | |
| 3,059,589 A | 10/1962 | Schreyer | |
| 3,124,330 A | 3/1964 | Robinson | |
| 3,306,562 A * | 2/1967 | Bellefleur | 248/188.2 |
| 3,408,028 A | 10/1968 | Raymond | |
| 3,408,780 A | 11/1968 | Brister | 52/58 |
| 3,425,473 A | 2/1969 | Knowlton | |

(Continued)

*Primary Examiner* — Kimberly Wood
(74) *Attorney, Agent, or Firm* — Kramer Levin Naftalis & Frankel LLP

(57) ABSTRACT

A clamp has a body, a wedged channel nut, and a bolt. The body has a first component extending from the body and configured to engage a module and a second component having a tapered body surface. A flange of the first component engages a first slot of the rail. The nut has a nut extension extending from the nut and away from the module. The nut extension includes a flange configured to engage a second slot of the rail. The nut also includes a tapered nut surface having an angle substantially identical to the angle of the tapered body surface of the second component. The tapered nut surface engages the tapered body surface. A bolt extends through the nut and the body. When the bolt is tightened, the nut and the body secure the module and rail together.

6 Claims, 17 Drawing Sheets

U.S. PATENT DOCUMENTS

| | | | | |
|---|---|---|---|---|
| 3,434,748 | A | 3/1969 | Leurent | 403/257 |
| 3,458,052 | A | 7/1969 | Kann | 211/193 |
| 3,483,910 | A | 12/1969 | LaLonde et al. | 411/112 |
| 3,493,025 | A | 2/1970 | LaLonde et al. | 411/103 |
| 3,612,585 | A | 10/1971 | Mayr | 403/264 |
| 3,778,175 | A | 12/1973 | Zimmer | 403/187 |
| 3,966,342 | A | 6/1976 | Moriya | 403/256 |
| 4,049,253 | A | 9/1977 | Mandel | |
| 4,061,301 | A | 12/1977 | Catena, Jr. | |
| 4,073,113 | A | 2/1978 | Oudot et al. | 52/710 |
| 4,429,440 | A | 2/1984 | Laughlin et al. | 24/486 |
| 4,533,277 | A | 8/1985 | Alexander et al. | |
| 4,569,530 | A * | 2/1986 | Cross | 279/123 |
| 4,575,295 | A | 3/1986 | Rebentisch | 411/85 |
| 4,586,301 | A | 5/1986 | Hickman | 52/96 |
| 4,764,340 | A | 8/1988 | Lui et al. | |
| 4,783,040 | A | 11/1988 | Lindberg et al. | 248/74.3 |
| 4,813,833 | A | 3/1989 | Haab | |
| 4,830,531 | A | 5/1989 | Condit et al. | 403/348 |
| 4,838,412 | A | 6/1989 | Backman | 198/838 |
| 4,917,553 | A | 4/1990 | Muller | 411/85 |
| 4,950,099 | A | 8/1990 | Roellin | |
| 4,957,402 | A | 9/1990 | Klein et al. | 411/84 |
| 5,079,791 | A | 1/1992 | Grech | |
| 5,087,879 | A | 2/1992 | Sugifune et al. | |
| 5,116,161 | A | 5/1992 | Faisst | 403/231 |
| 5,118,233 | A | 6/1992 | Mitchell | 411/5 |
| 5,209,620 | A | 5/1993 | Zare-Ardestani | |
| 5,259,165 | A | 11/1993 | Koyama | |
| 5,269,784 | A | 12/1993 | Mast | |
| 5,271,586 | A | 12/1993 | Schmidt | 248/58 |
| 5,303,926 | A | 4/1994 | Owens et al. | |
| 5,316,244 | A | 5/1994 | Zetena | 248/49 |
| 5,329,694 | A | 7/1994 | Sickels et al. | |
| 5,340,251 | A | 8/1994 | Takahashi et al. | |
| 5,345,737 | A | 9/1994 | Latchinian | 52/280 |
| 5,351,926 | A | 10/1994 | Moses | 248/354.5 |
| 5,352,078 | A * | 10/1994 | Nasu | 411/337 |
| 5,413,437 | A | 5/1995 | Bristow | |
| 5,433,053 | A | 7/1995 | Tulloch | |
| D363,997 | S | 11/1995 | Nomura | D25/122 |
| 5,464,232 | A * | 11/1995 | Chizmadia | 279/124 |
| 5,481,842 | A | 1/1996 | Gautreau | 52/656.9 |
| 5,497,973 | A | 3/1996 | Balzen et al. | |
| 5,520,292 | A | 5/1996 | Lombardi | 211/85.6 |
| 5,531,552 | A | 7/1996 | Takahashi et al. | |
| D378,047 | S | 2/1997 | Chudoba | D8/354 |
| 5,636,426 | A | 6/1997 | Luckhardt et al. | |
| 5,713,116 | A | 2/1998 | Nickerson et al. | |
| 5,762,720 | A | 6/1998 | Hanoka et al. | 136/251 |
| 5,797,573 | A * | 8/1998 | Nasu | 248/231.31 |
| 5,797,581 | A | 8/1998 | Sherman | |
| 5,800,436 | A | 9/1998 | Lerch | |
| 5,875,600 | A | 3/1999 | Redman | 52/656.4 |
| 5,946,797 | A | 9/1999 | Kawabe et al. | |
| 5,988,930 | A | 11/1999 | Liebetrau et al. | |
| 5,991,998 | A | 11/1999 | Kaneko | |
| 6,086,300 | A | 7/2000 | Frohlich | 411/84 |
| 6,216,997 | B1 | 4/2001 | Short | |
| 6,220,804 | B1 | 4/2001 | Pamer et al. | |
| 6,249,954 | B1 | 6/2001 | Kawabe et al. | |
| 6,290,426 | B1 | 9/2001 | van Gijsel et al. | 403/374.3 |
| 6,342,138 | B1 | 1/2002 | Brown | |
| 6,360,491 | B1 | 3/2002 | Ullman | 52/22 |
| 6,364,262 | B1 * | 4/2002 | Gibson et al. | 248/229.14 |
| 6,435,781 | B1 | 8/2002 | Jones | |
| 6,450,475 | B1 * | 9/2002 | Tsai et al. | 248/650 |
| 6,488,458 | B2 | 12/2002 | Ninomiya et al. | |
| 6,526,701 | B2 | 3/2003 | Stearns et al. | 52/24 |
| 6,571,407 | B1 * | 6/2003 | Skarie | 4/695 |
| 6,591,475 | B2 | 7/2003 | Ninomiya et al. | |
| 6,609,288 | B2 | 8/2003 | Ninomiya et al. | |
| 6,612,642 | B2 | 9/2003 | Kasahara | |
| 6,672,018 | B2 | 1/2004 | Shingleton | 52/173.3 |
| 6,679,640 | B1 | 1/2004 | Smith | |
| 6,685,154 | B1 | 2/2004 | Blyth et al. | |
| 6,712,540 | B2 | 3/2004 | Schmalzhofer et al. | 403/248 |
| 6,712,543 | B1 | 3/2004 | Schmalzhofer | 403/381 |
| 6,712,568 | B2 | 3/2004 | Snyder et al. | 410/104 |
| 6,719,481 | B2 | 4/2004 | Hoffmann | 403/403 |
| 6,739,038 | B2 | 5/2004 | Herold | |
| 6,745,443 | B2 | 6/2004 | Matsumoto et al. | |
| 6,751,851 | B2 | 6/2004 | Ninomiya et al. | |
| 6,751,854 | B2 | 6/2004 | Takiyama | |
| 6,751,914 | B2 | 6/2004 | Zeh et al. | 52/239 |
| 6,757,953 | B2 | 7/2004 | Matsumoto et al. | |
| 6,758,014 | B2 | 7/2004 | Chen | 52/63 |
| 6,804,871 | B1 | 10/2004 | Smith | |
| 6,807,791 | B2 | 10/2004 | Herb | 52/846 |
| 6,827,531 | B2 | 12/2004 | Womack et al. | 410/104 |
| 6,846,140 | B2 | 1/2005 | Anderson et al. | 410/104 |
| 6,872,038 | B2 | 3/2005 | Westlake | 411/85 |
| 6,877,199 | B2 | 4/2005 | Cassese et al. | |
| 6,910,609 | B2 | 6/2005 | Williams et al. | 224/519 |
| 6,962,591 | B2 | 11/2005 | Lerch | |
| 7,004,667 | B2 | 2/2006 | Ludwig et al. | 403/258 |
| 7,111,909 | B2 | 9/2006 | Andersen | |
| 7,124,492 | B2 | 10/2006 | Wojciechowski et al. | |
| 7,178,880 | B2 | 2/2007 | Andersen | |
| 7,246,547 | B2 | 7/2007 | Van Walraven | 81/461 |
| 7,249,624 | B2 | 7/2007 | Zeh et al. | 160/371 |
| 7,260,918 | B2 | 8/2007 | Liebendorfer | 52/173.3 |
| 7,275,903 | B2 | 10/2007 | Schultz | |
| 7,281,889 | B2 | 10/2007 | Anderson et al. | 410/104 |
| 7,338,245 | B2 | 3/2008 | Ladouceur | 411/427 |
| 7,341,413 | B2 | 3/2008 | Morris et al. | |
| 7,386,922 | B1 * | 6/2008 | Taylor et al. | 24/569 |
| 7,389,621 | B2 | 6/2008 | Hawes | 52/655.1 |
| 7,434,362 | B2 | 10/2008 | Liebendorfer | 52/173.3 |
| 7,434,364 | B2 | 10/2008 | MacDermott et al. | |
| 7,475,466 | B2 | 1/2009 | Marume et al. | |
| 7,588,222 | B1 | 9/2009 | Feldberg | |
| 7,594,787 | B2 | 9/2009 | Womack et al. | 410/104 |
| 7,600,349 | B2 | 10/2009 | Liebendorfer | 52/173.3 |
| 7,604,429 | B2 | 10/2009 | Prange | 403/403 |
| 7,604,444 | B2 | 10/2009 | Wu | 411/85 |
| 7,621,487 | B2 | 11/2009 | Brown et al. | 248/65 |
| 7,634,875 | B2 | 12/2009 | Genschorek | 52/173.3 |
| 7,650,716 | B1 | 1/2010 | Schemeley | 47/23.1 |
| 7,748,175 | B2 | 7/2010 | Liebendorfer | 52/173.3 |
| 7,766,292 | B2 | 8/2010 | Liebendorfer | 248/237 |
| 7,780,472 | B2 | 8/2010 | Lenox | |
| 7,789,352 | B2 | 9/2010 | Darling, III | |
| 7,797,883 | B2 | 9/2010 | Tarbell et al. | 52/27 |
| 7,797,906 | B2 | 9/2010 | Kassem | 52/713 |
| D627,717 | S | 11/2010 | Munoz et al. | D13/102 |
| 7,849,576 | B2 | 12/2010 | Sawada et al. | |
| 7,861,485 | B1 | 1/2011 | Wentworth et al. | 52/745.06 |
| 7,874,774 | B2 | 1/2011 | Peterson | 410/104 |
| 7,921,607 | B2 | 4/2011 | Thompson et al. | 52/60 |
| 7,971,398 | B2 | 7/2011 | Tweedie | 52/173.3 |
| 2002/0046506 | A1 | 4/2002 | Ullman | 52/1 |
| 2002/0066235 | A1 | 6/2002 | Stearns et al. | 52/24 |
| 2003/0015637 | A1 | 1/2003 | Liebendorfer | 248/237 |
| 2003/0049094 | A1 | 3/2003 | Westlake | 411/84 |
| 2003/0101662 | A1 | 6/2003 | Ullman | 52/27 |
| 2003/0177706 | A1 | 9/2003 | Ullman | 52/3 |
| 2003/0198530 | A1 | 10/2003 | Hoffmann et al. | 411/84 |
| 2003/0206785 | A1 | 11/2003 | Hoffmann et al. | 411/84 |
| 2004/0163338 | A1 | 8/2004 | Liebendorfer | 52/173.1 |
| 2004/0165965 | A1 | 8/2004 | Unverzagt et al. | 411/84 |
| 2005/0226683 | A1 | 10/2005 | Herb | 403/230 |
| 2006/0156648 | A1 | 7/2006 | Thompson et al. | 52/173.3 |
| 2008/0010915 | A1 | 1/2008 | Liebendorfer | 52/173.3 |
| 2008/0121273 | A1 | 5/2008 | Plaisted et al. | 136/251 |
| 2010/0041486 | A1 | 2/2010 | Selle | |
| 2010/0088996 | A1 | 4/2010 | Thompson et al. | 52/704 |
| 2010/0170163 | A1 | 7/2010 | Tarbell et al. | 52/27 |
| 2010/0192505 | A1 | 8/2010 | Schaefer et al. | 52/653.2 |
| 2010/0263297 | A1 | 10/2010 | Liebendorfer | 52/11 |
| 2010/0276558 | A1 | 11/2010 | Faust et al. | 248/222.14 |
| 2011/0036028 | A1 | 2/2011 | Beck | |
| 2011/0120047 | A1 | 5/2011 | Stearns et al. | 52/698 |

* cited by examiner

UNIVERSAL END CLAMP

CROSS-REFERENCE TO RELATED APPLICATIONS

This application is a divisional application of U.S. application Ser. No. 12/470,682, entitled "Universal End Clamp," filed May 22, 2009, which claims priority to U.S. Provisional Patent Application Ser. No. 61/071,891, entitled "Device and Method for Solar Panel Installation," filed May 22, 2008, which is hereby incorporated by reference in its entirety. This application is related to U.S. patent application Ser. No. 12/470,697, entitled "Module Attachment Apparatus and Method," filed May 22, 2009, and U.S. patent application Ser. No. 12/470,588, entitled "Camming Clamp for Roof Seam," filed May 22, 2009.

FIELD OF THE INVENTION

The invention relates generally to a clamp for securing a solar module or other component to a rail.

BACKGROUND

Solar energy generation is a rapidly growing technology worldwide and offers the potential of almost unlimited clean and sustainable energy. However, the use of solar electric technology has been limited by the costs associated with installing solar panels to existing and new structures and facilities.

When installing a solar module on a rail, various clamps must be utilized due to the varying sizes of the modules and various rail configurations. As a result, it is desirable to have a clamp that can be used to secure different types of modules to different types of rails.

The solar module is often installed on a roof or other surface for exposure to sunlight. As a result, the installed solar module can be viewed. Accordingly, it is desirable to have a clamp that is aesthetically pleasing and is preferably hidden under the module frames.

Because maintenance may be required for the solar modules and because the solar modules may be installed on a roof or other surface where access is often needed, safety is also an important consideration. Modules can be installed at a variety of heights, commonly about three to eight feet off the ground, and on a variety of surfaces, such as a roof of a building. When someone is walking next to a solar module, it is desirable that the rail does not extend past the edge of the module.

SUMMARY OF THE INVENTION

Various embodiments described herein attempt to overcome the drawbacks of the conventional techniques and devices for solar cell array installation.

The systems, methods, and devices described herein can offer, among other advantages, decreased cost of installing solar cell arrays or components thereof. This can be accomplished in an efficient and robust manner compared with the current installation techniques and devices. The systems, methods, and devices can be installed without drilling components during installation. Also, the modular nature can allow for easier installation and breakdown.

In one embodiment, a clamp comprises a body, a wedged channel nut, and a bolt. The body has a first component extending from the body and configured to engage a module and a second component having a tapered body surface. The wedged channel nut has a first flange and a second flange extending from opposing sides of the nut and configured to engage a rail and a tapered nut surface having an angle substantially identical to the angle of the tapered body surface of the second component, wherein the tapered nut surface engages the tapered body surface. A bolt extends through the wedged channel nut and the body. When the bolt is tightened, the nut and the body secure the module and rail together.

In another embodiment, a system comprises a module, a rail configured to support a module; and a clamp. The clamp includes a body including a first component extending from the body and configured to engage a surface of the module; and a second component having a tapered body surface. The clamp also includes a nut including a first flange and a second flange extending from opposing sides of the nut and configured to engage opposing sides of the rail; and a tapered nut surface having an angle substantially identical to the angle of the tapered body surface of the second component, wherein the tapered nut surface engages the tapered body surface. A bolt extends through the nut and the body. When the bolt is tightened, the nut and the body secure the module and rail together.

In yet another embodiment, a clamp comprises a body, a nut, and a bolt. The body includes a first component extending from the body and configured to engage a module; a second component extending from the body and configured to engage a first slot in a rail; and a third component having a tapered body surface. The nut includes a tapered nut surface having an angle substantially identical to the angle of the tapered body surface of the third component, wherein the tapered nut surface engages the tapered body surface; and a nut extension having a nut flange configured to engage a second slot of the rail. A bolt extends through the nut and the body. Tightening of the bolt causes the nut and the body to secure the module and rail together.

In another embodiment, a clamp comprises a bolt extending at least a width of a module; a body having an aperture to receive the bolt and a body flange extending from the body toward the module; and a nut having a nut aperture for receiving the bolt and a first nut flange and a second nut flange extending from the module. Tightening of the bolt causes the nut and the body to secure the module and rail together, wherein the body flange is configured to pierce the module, and wherein the first nut flange and the second nut flange are configured to pierce the rail. Piercing of the rail and module surface finishes can ensure electrical and grounding conductivity between all of the associated components.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Figure 1A:
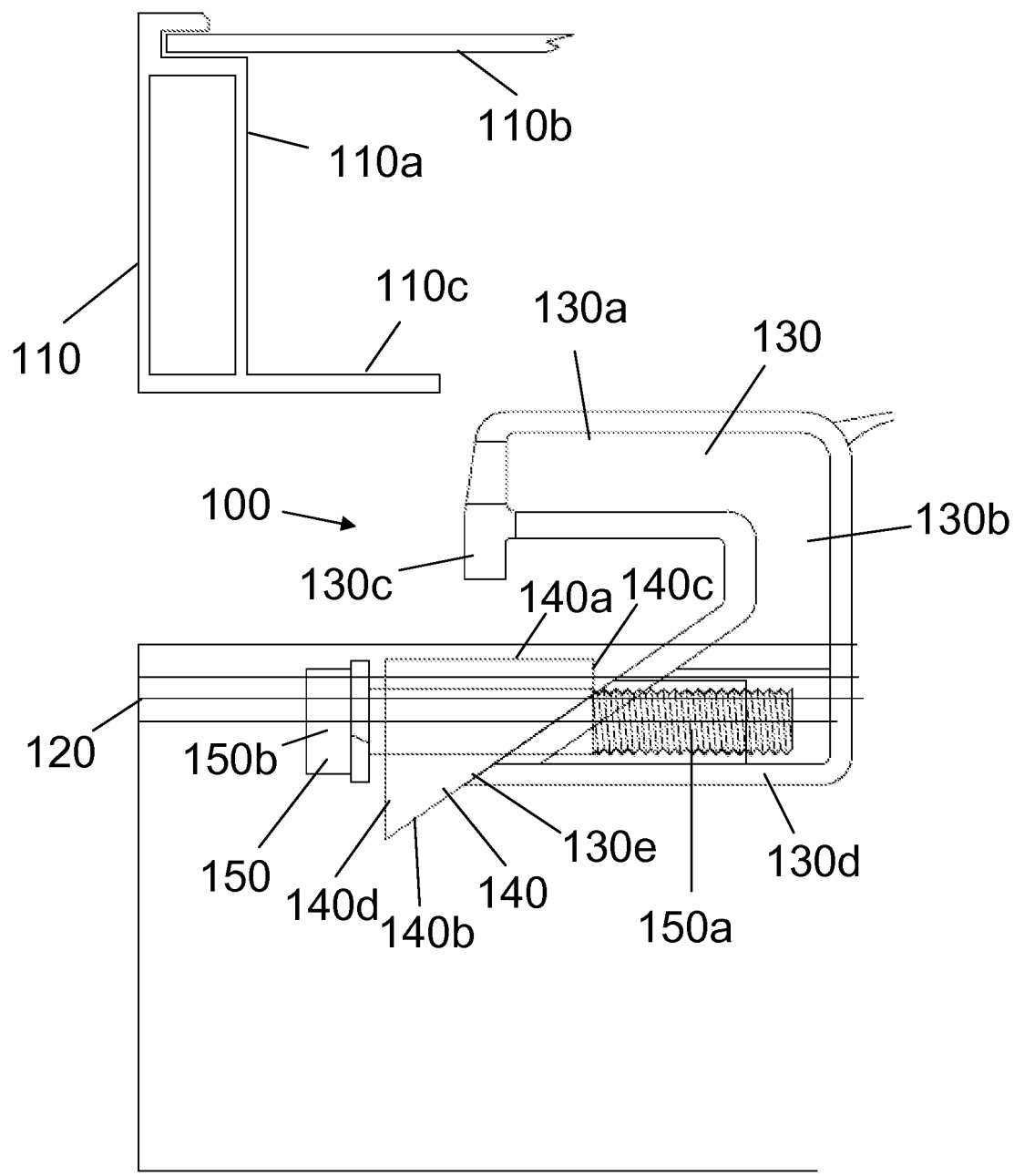
FIG. 1a shows a cross-sectional view of single bolt universal module end clamp in a first installation position according to an exemplary embodiment.

Reference will now be made in detail to the preferred embodiments of the present invention, examples of which are illustrated in the accompanying drawings.

FIGS. 1a to 1d show an installation of a single bolt universal module end clamp 100 for securing a solar module 110 to a rail 120. FIGS. 1e and 1f show perspective views of the components of the module end clamp 100. FIG. 1g shows an exploded view of an installed module end clamp 100. Although a solar module is described herein, it is intended to include any component of a solar cell array to be secured, including, but not limited to, a photovoltaic array, a photovoltaic module, a solar cell, a rail, a solar panel, a solar tracker, a mounting post or pole, and a mounting bracket. However, the term module is not intended to be limited to components used for solar energy and solar component installation. The module can apply to any component that can be secured to a roof, including, but not limited to, a satellite dish, an antenna, and HVAC equipment. Also, although the clamp may be referred to as an end clamp, the clamp can be used at any location along a rail to secure a module. Additionally, in some embodiments, the clamp may be configured as a mid clamp.

The exemplary module 110 shown represents an end portion of the module 110. The module 110 includes a frame 110a that extends perpendicular to and supports a solar panel glass 110b. On a distal end of the frame 110a opposite the solar panel glass 110b, the frame 110a includes a flange 110c extending perpendicular to the frame 110a in a direction beneath the solar panel 110b. The flange 110c shown is merely exemplary, but it is common for various configurations of modules to include a flange. The underside of flange 110c is flat and is configured to abut a flat, upper surface of the rail 120. Although this exemplary module is shown, it is intended that any configuration of module can be used.

The rail 120 can be secured by a variety of means to a roof or other surface for mounting the solar module for exposure. As shown in the cross-sectional view in FIG. 1d, the rail 120 can be constructed of a single material, such as anodized aluminum. In this exemplary embodiment, the rail 120 has a first vertical component 120a and a second vertical component 120b that are substantially connected by a horizontal component 120c to form a void 120d that can receive the clamp 100. The first vertical component 120a and the second vertical component 120b can be used to support the module 110 and abut or engage an installed wedged channel nut 140.

The end clamp 100 has an end clamp body 130, an end clamp wedged channel nut 140, and a torque bolt 150. The body 130 has a horizontal component 130a and a vertical component 130b extending perpendicular to the horizontal component 130a. At a distal end of the horizontal component 130a, the body 130 has a flange 130c extending downwardly and perpendicular from the horizontal component 130a. The vertical component 130b extends into a nut-receiving component 130d that extends outwardly in a direction away from the horizontal component 130a. In a direction parallel to the horizontal component 130a, the nut-receiving component 130d tapers to a point 130e.

The wedged channel nut 140 has a first surface 140a that is flat and configured to abut a flat surface of the rail 120. The wedged channel nut has a second surface 140b configured at an angle substantially identical to the angle of the tapered nut-receiving component 130d. A third surface 140c is perpendicular to the first surface 140a and is configured so that it can abut a flat surface of the vertical component 130b. A fourth surface 140d, which faces a direction away from the body 130, is configured to receive the bolt 150 through an aperture 140e, shown in FIG. 1d. The aperture 140e is elongated and is configured to allow movement of wedged channel nut 140 in a vertical direction while maintaining the position of the bolt 150.

The bolt 150 extends through the wedged channel nut 140 and into the body 130. The body 130 has a threaded aperture for receiving a threaded component 150a of the bolt 150. The bolt 150 can engage or disengage the wedged channel nut 140 and the body 130 by using torque to rotate a polygonal component 150b at a distal end of the bolt 150. It is intended that the bolt 150 can have any configuration at the distal end that allows a user to rotate the bolt or allows the bolt to engage or disengage, such as a screwdriver receiving recess, and is not limited to a polygonal component, such as a hexagonal or pentagonal shaped component. In this exemplary embodiment, when the bolt 150 is completely tightened, a distal end of the threaded component 150a can extend past the nut-receiving component 130d of the body 130.

As shown in FIG. 1a, the module 110 can be secured to the rail 120 by lowering the module 110 onto the rail 120, whereby the clamp 100 does not obscure the alignment of the module 110 and the rail 120. The bolt 150 and wedged channel nut 140 are in an initial position whereby the wedged channel nut is at a first position resting along nut receiving component 130d.

Figure 1B:
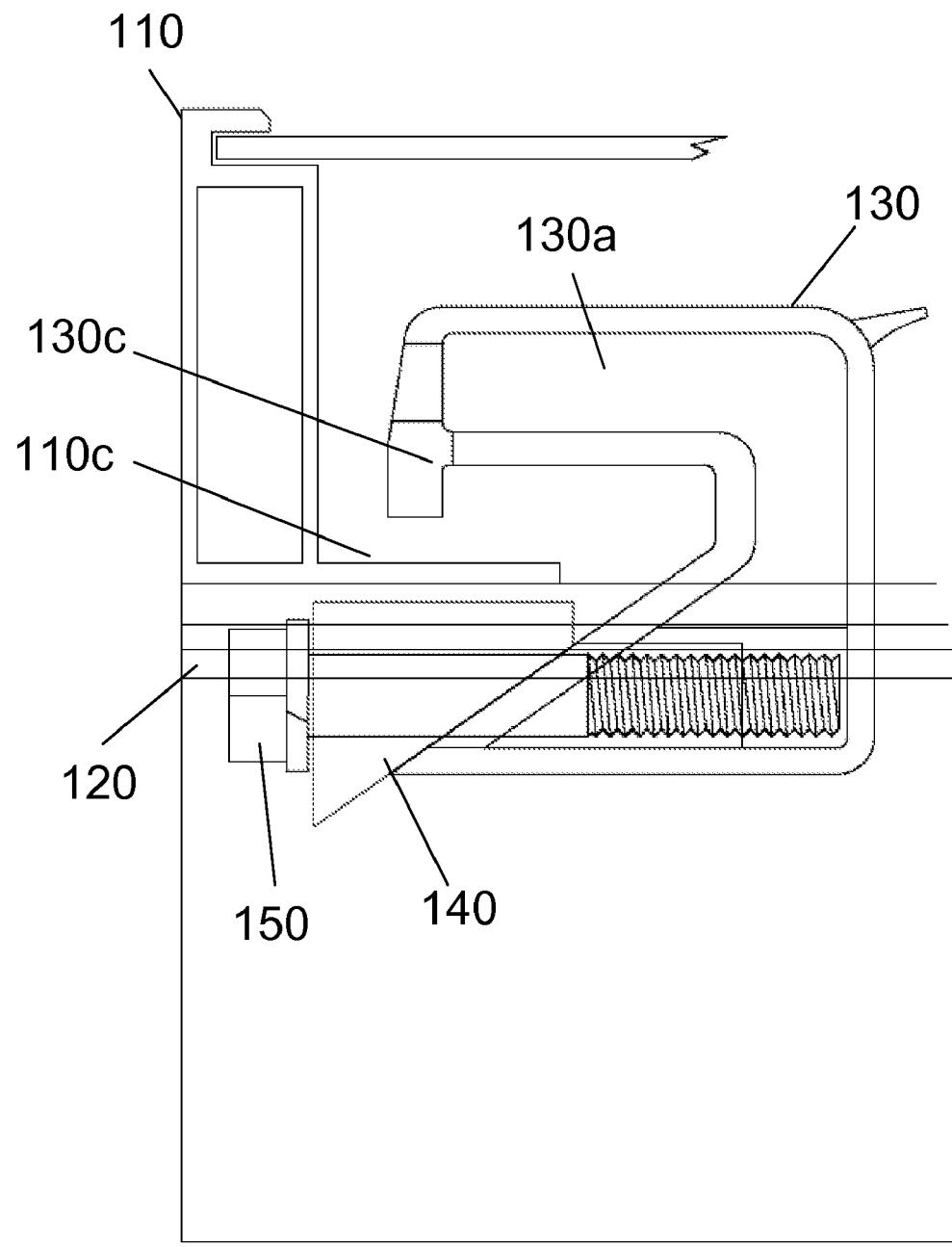
FIG. 1b shows a cross-sectional view of single bolt universal module end clamp in a second installation position according to an exemplary embodiment.

Referring to FIG. 1b, the module 110 is aligned with the rail 120. The clamp 100 can be guided such that the horizontal component 130a and flange 130c of the body 130 are positioned above the flange 110c of the module 110. Additionally, the wedged nut channel 140 is positioned beneath the rail 120 and substantially aligned with the flange 110c. Once the clamp 100 is substantially in this position, the bolt 150 can be tightened so that the wedged channel nut 140 engages the body 130 to secure the module 110 to the rail 120.

Figure 1C:
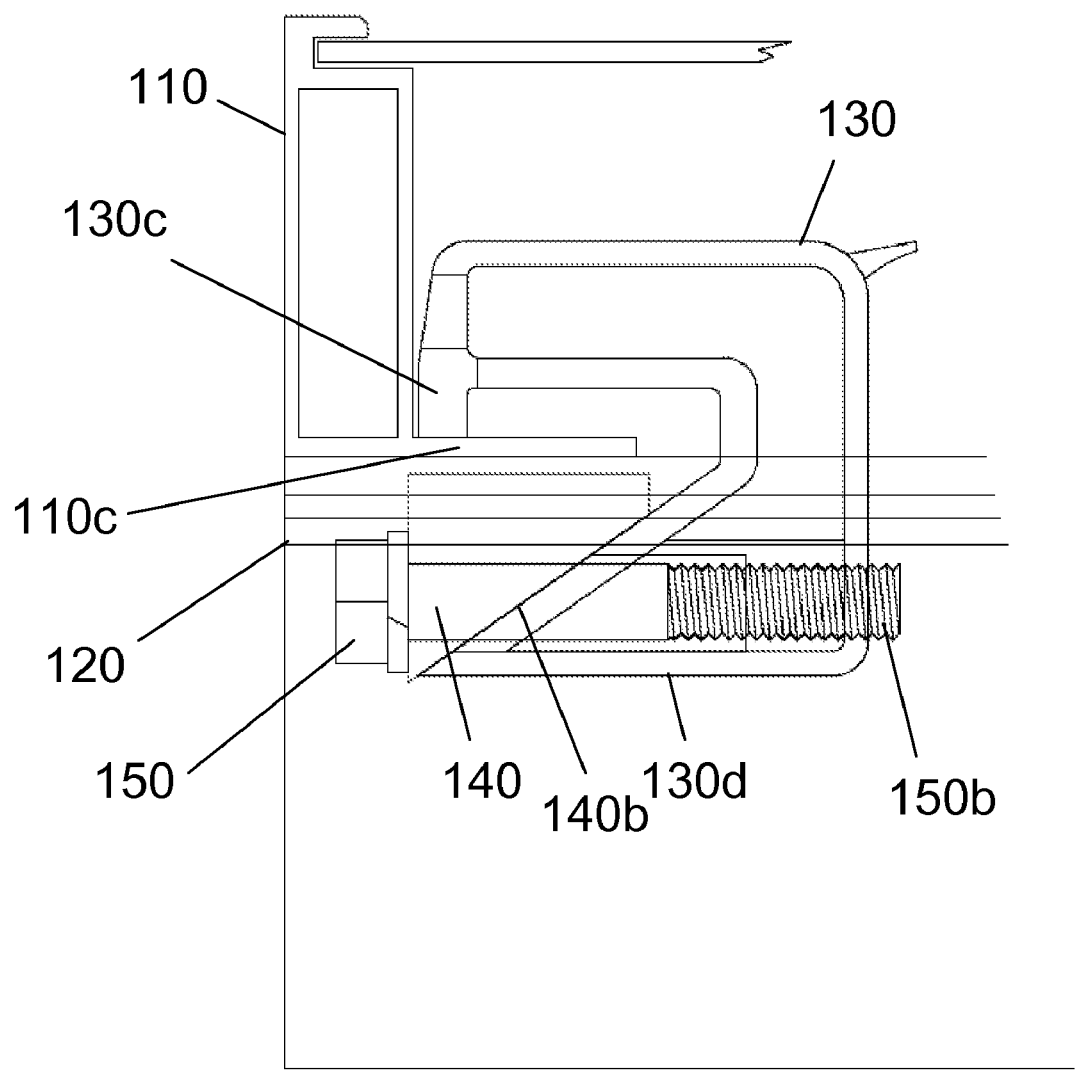
FIG. 1c shows a cross-sectional view of single bolt universal module end clamp in a third installation position according to an exemplary embodiment.
Figure 1D:
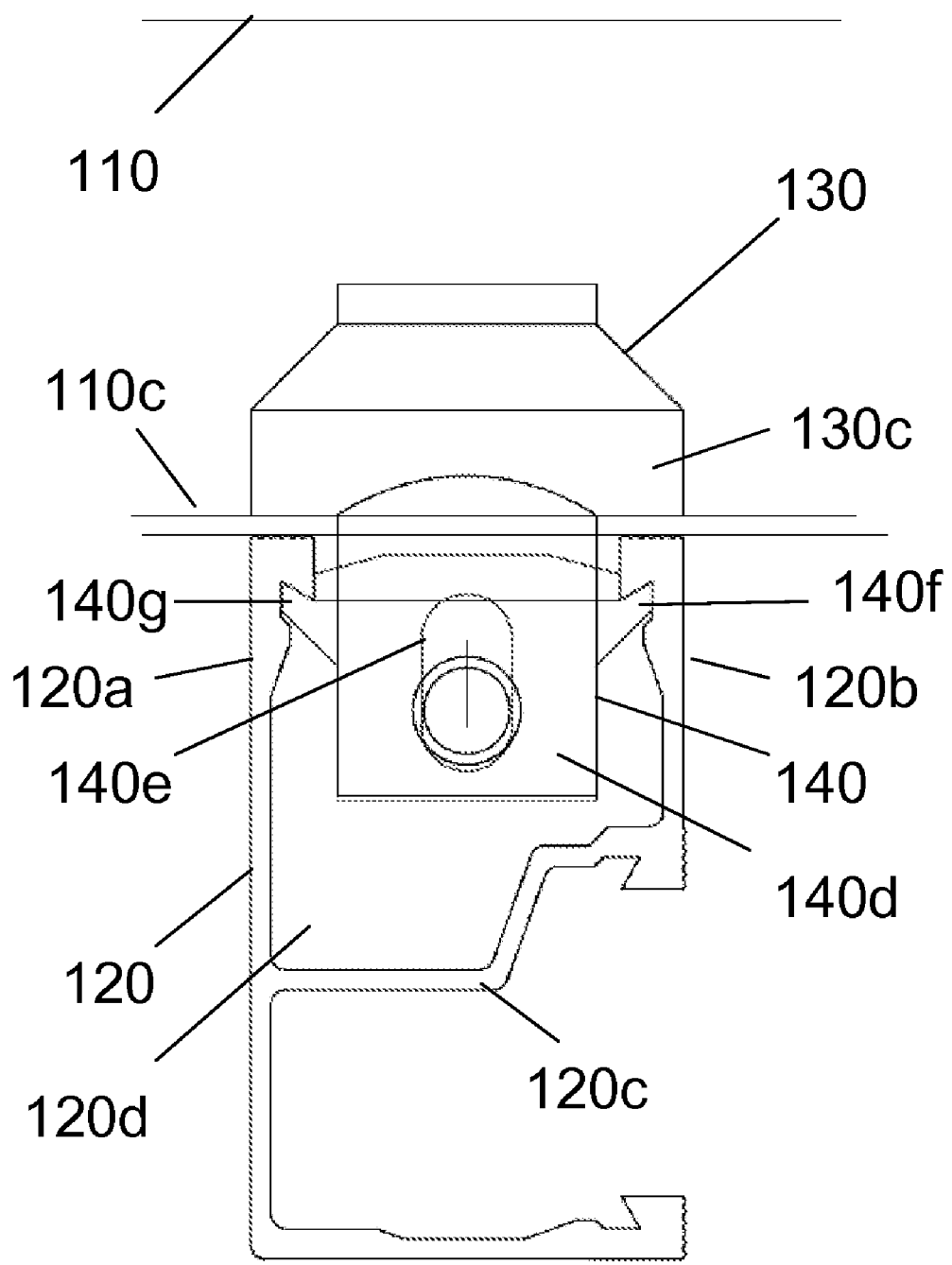
FIG. 1d shows an end view of single bolt universal module end clamp in a final installation position according to an exemplary embodiment.
Figure 1E:
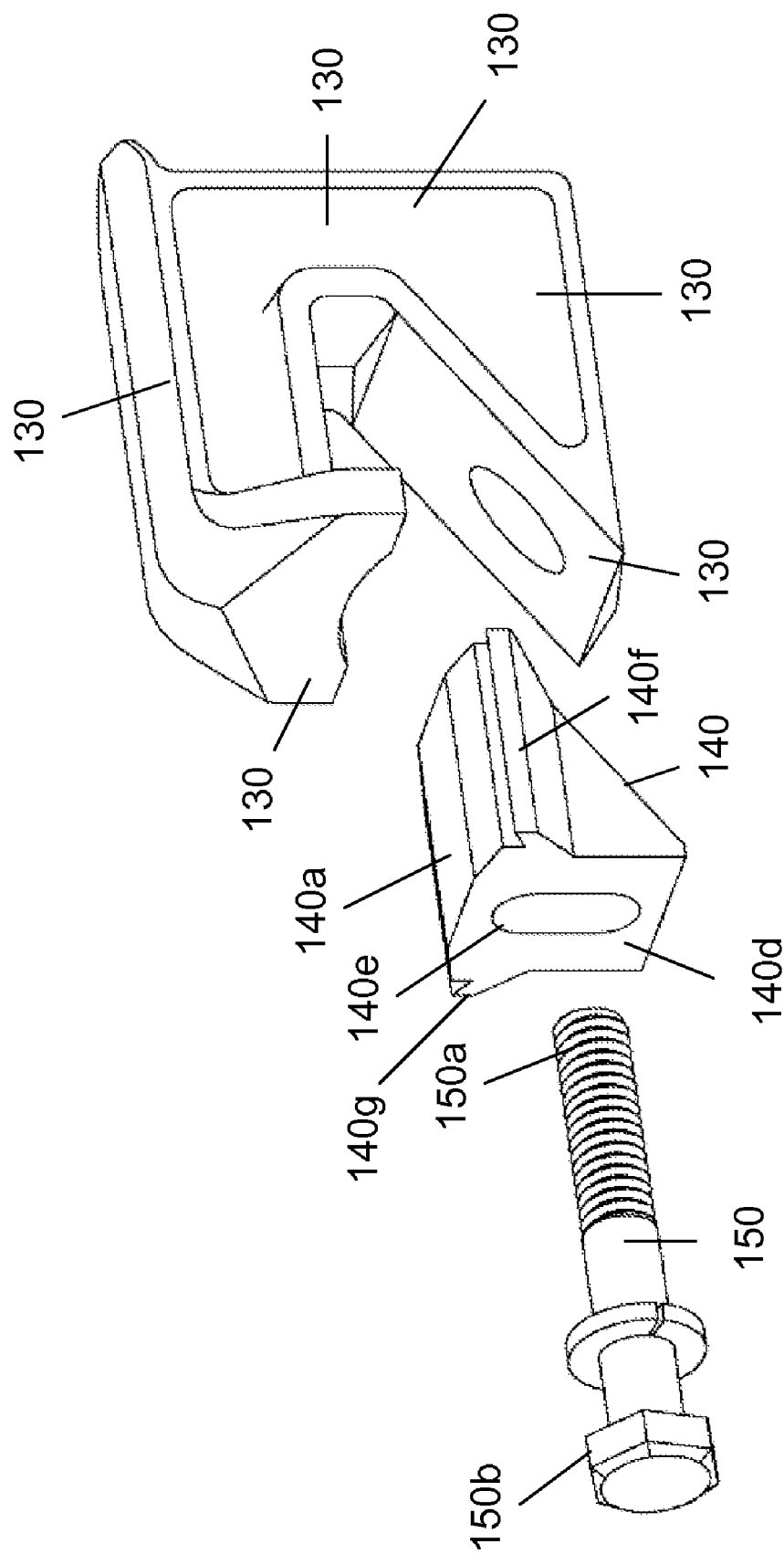
FIG. 1e shows an exploded view of a module end clamp according to an exemplary embodiment.
Figure 1F:
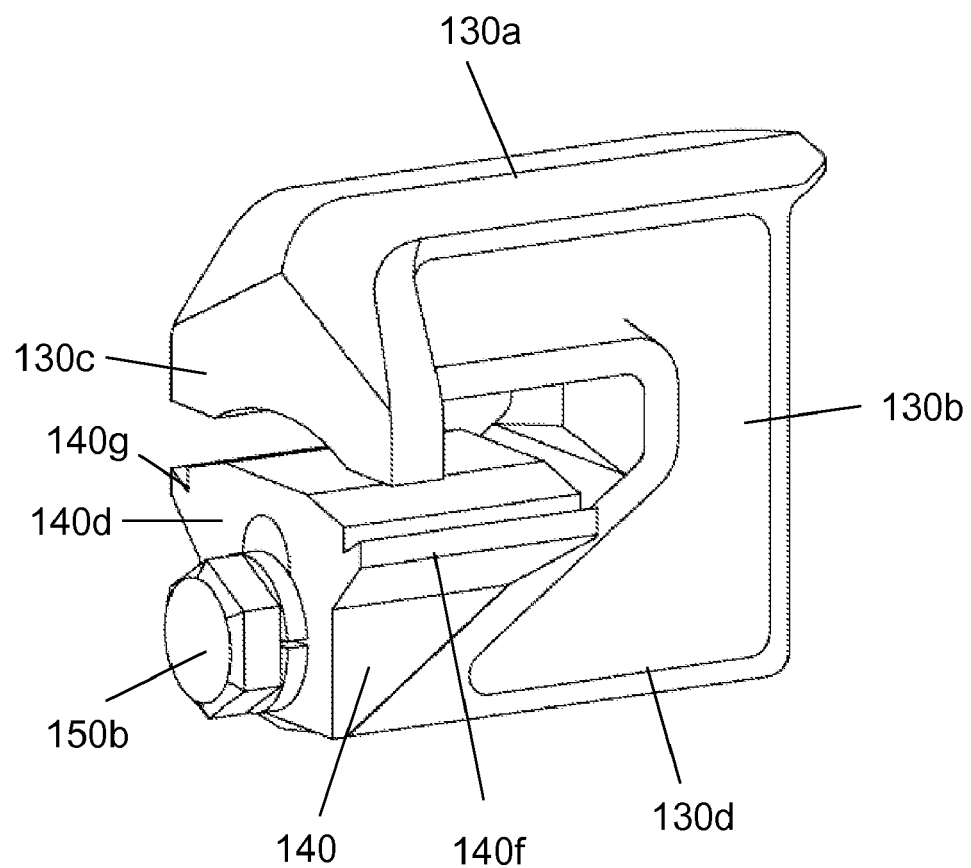
FIG. 1f shows an assembled view of a module end clamp according to an exemplary embodiment.
Figure 1G:
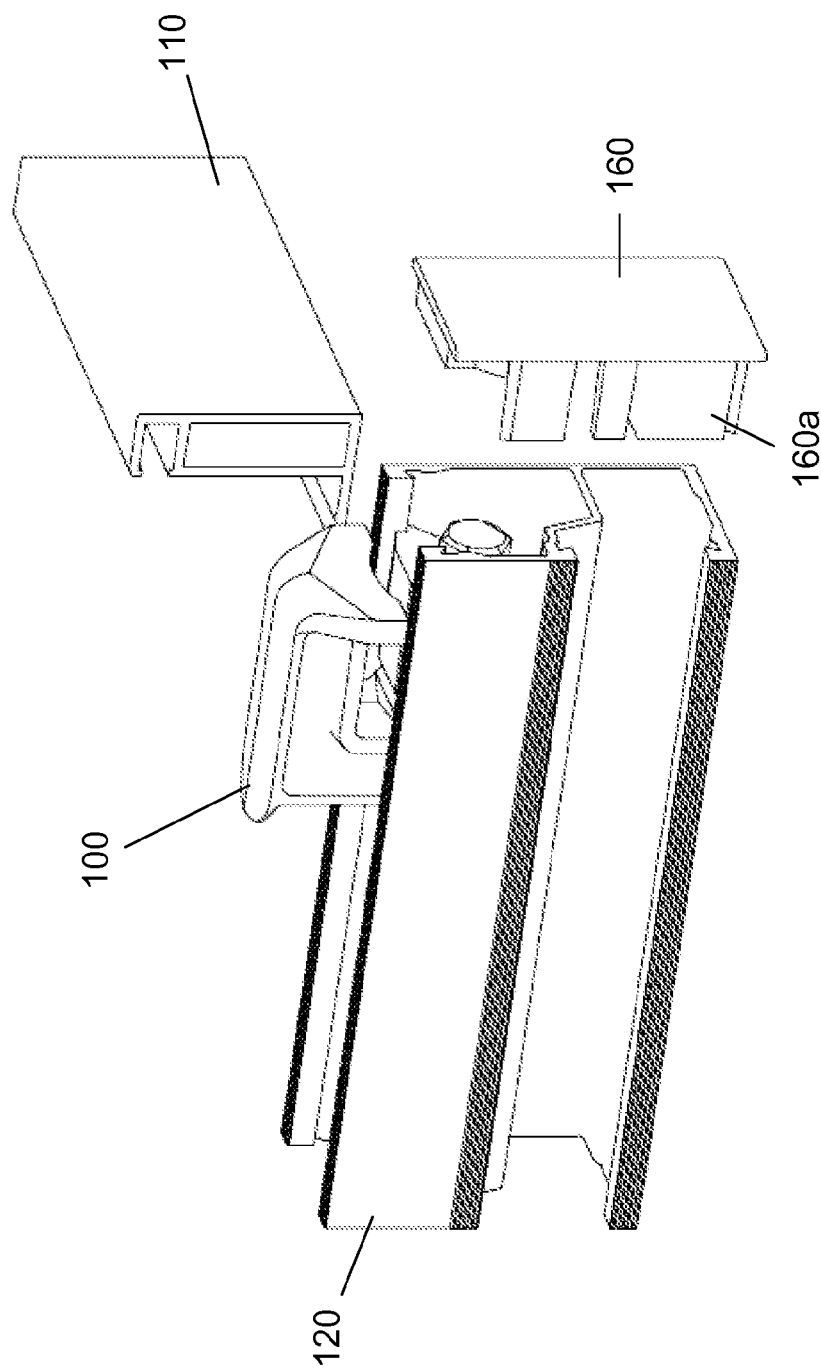
FIG. 1g shows an exploded view of an installed module end clamp according to an exemplary embodiment.

FIG. 1c shows a cross-sectional view of the module 110 and the rail 120 having a substantially installed clamp 100. FIG. 1d shows an end view of the module 110 and rail 120 having an installed clamp 100. Torque is applied to the bolt 150 causing the threaded component 150b to engage the aperture of the body 130 and extend beyond the aperture in the nut receiving component 130b. As the bolt 150 is rotated, the second surface 140b of the wedged channel nut 140 slides along the nut receiving component 130d. As the wedged channel nut 140 slides along the nut receiving component 130d, the module 110 and the rail 120 are held together by a force pushing down by the flange 130c of the body 130 and a force pushing up from the wedged channel nut 140. These forces, which are maintained by the position of the bolt 150, cause the clamp 100 to lock the module 110 against the rail 120. The amount of tightening of the bolt 150 required to secure the module 110 to the rail 120 can depend upon the thickness of the module 110 and the thickness of the rail 120.

As shown in FIGS. 1d, 1e, and 1f, the wedged channel nut 140 has a first flange 140f and a second flange 140g, each of which extend along a side of the wedged channel nut 140 in a direction substantially parallel to the direction of the bolt 150. As the wedged channel nut engages the rail 120, the first flange 140f and the second flange 140g can enter a recess in the rail 120 or be configured to puncture a surface of the rail 120. The first flange 140f and the second flange 140g force the rail 120 in a direction towards the module 110.

By installing the clamp 100 on the module 110 and the rail 120, a solar cell array or components thereof can be secured together without drilling into either component. By securing the rail 120 to a roof or other support surface, the module 110 can be supported and positioned without any damage to the module 110. Also, by reversing the process described above, the clamp 100 can be uninstalled in a similar fashion.

FIG. 1g shows an exploded view of the installed clamp 100 securing the module 110 to the rail 120. Because the installed clamp 100 is set back slightly from an edge of the rail 120, a cap 160 can be installed on the rail 120. The cap 160 can include a plurality of cap extensions 160a that are inserted into the rail 120 to frictionally engage the rail 120. In one exemplary embodiment, the cap 160 can be made of rubber, though any known material to one of the art can be used. The installation of the cap 160 allows a flush end of the rail 120, which is safer than exposing the sharp edges of the rail 120 and can be more aesthetic.

Figure 2A:
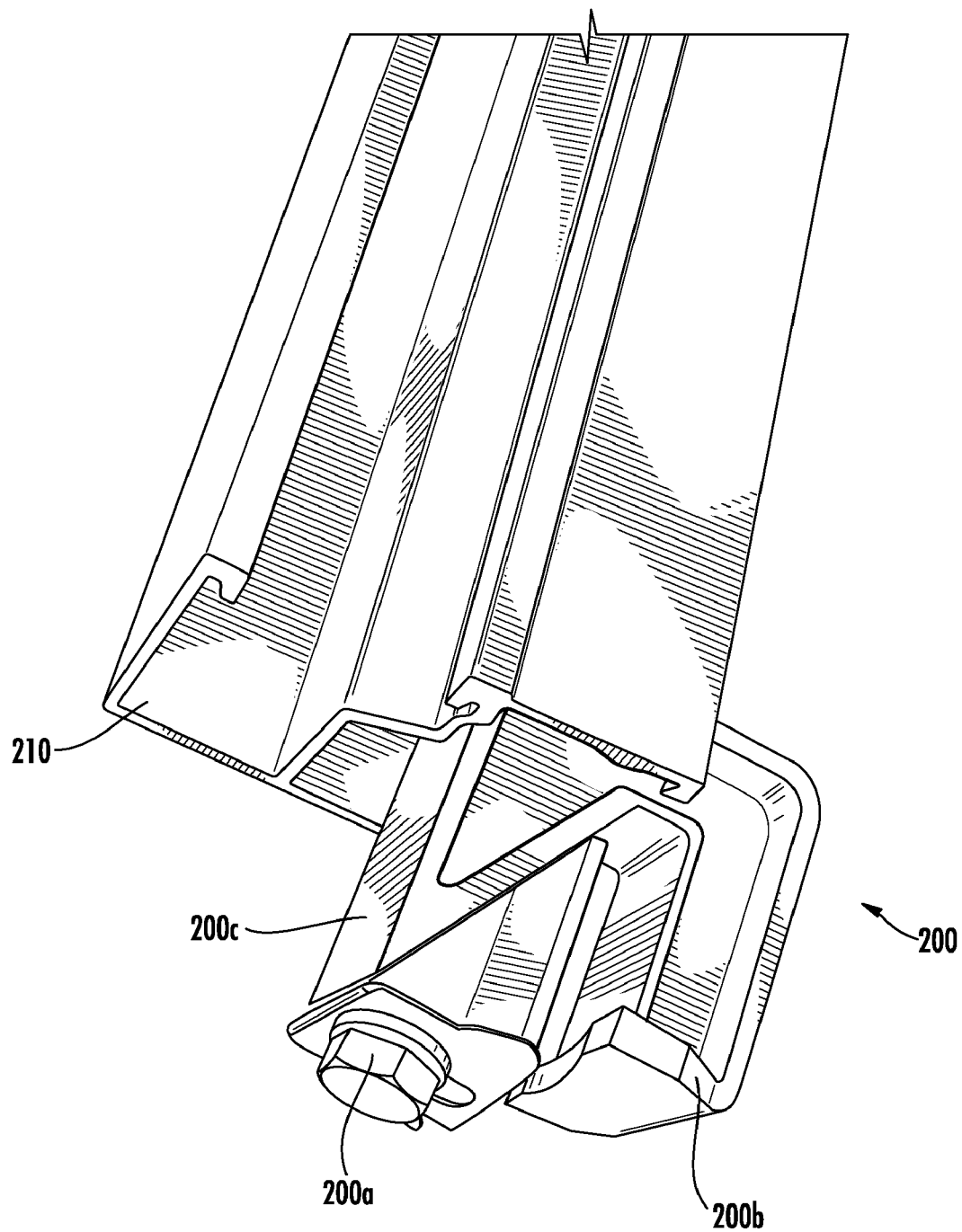
FIG. 2a shows a perspective view of a module end clamp in a first installation position according to an exemplary embodiment.
Figure 2B:
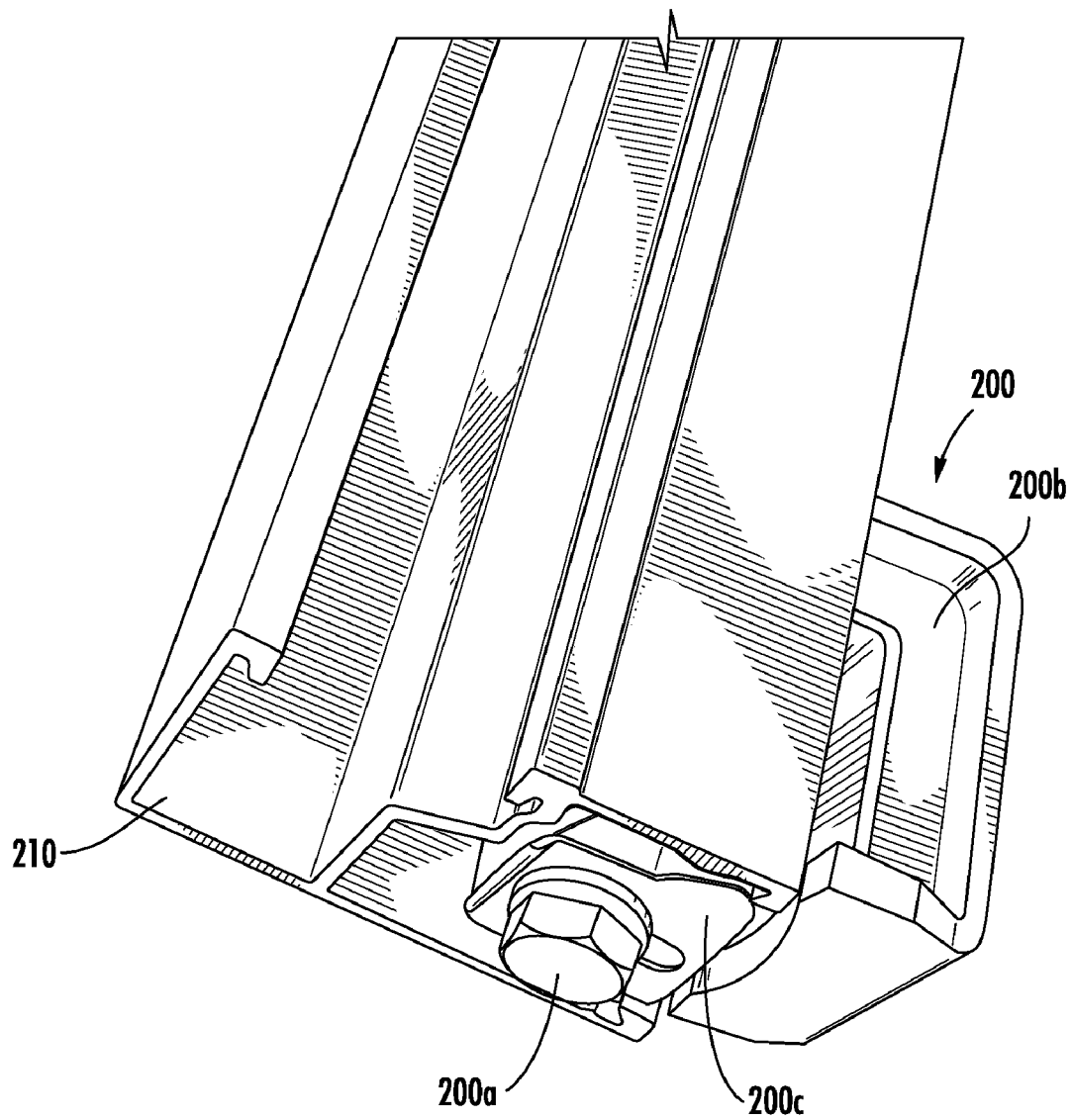
FIG. 2b shows a perspective view of a module end clamp in a second installation position according to an exemplary embodiment.
Figure 2C:
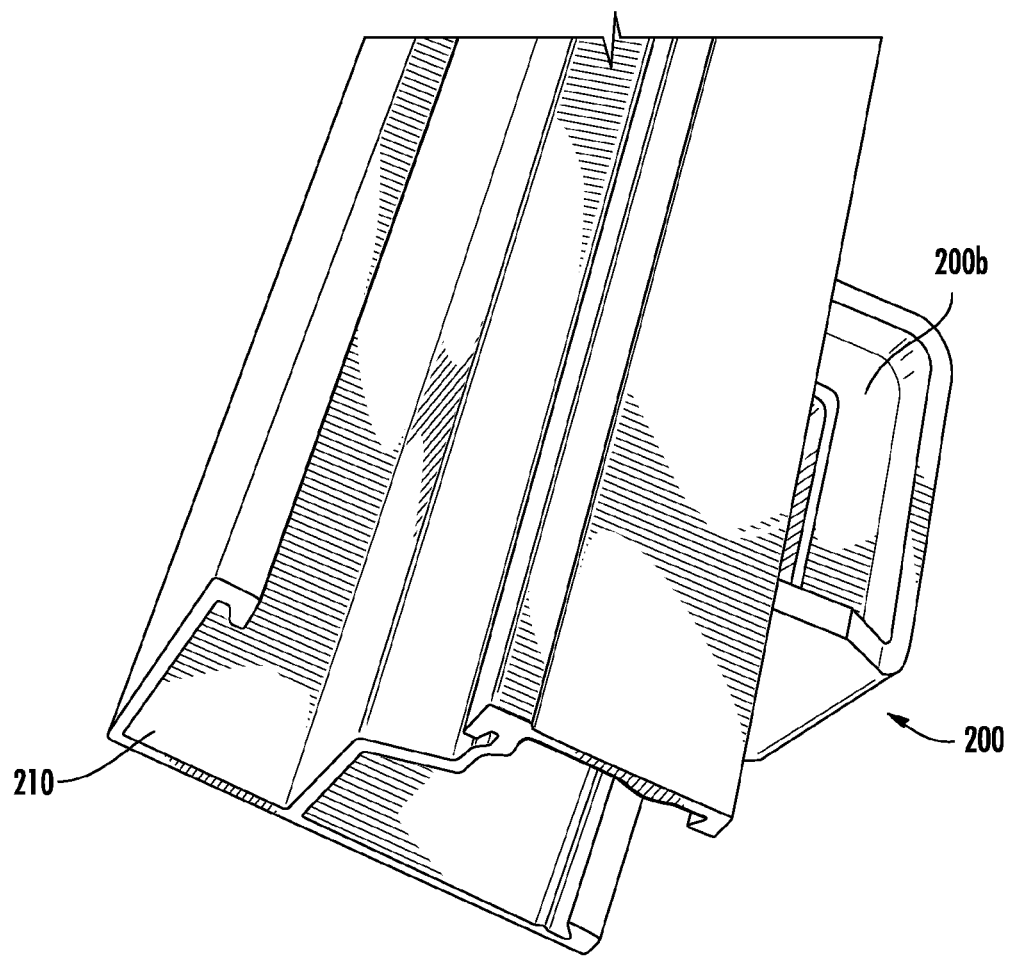
FIG. 2c shows a perspective view of a module end clamp in a third installation position according to an exemplary embodiment.
Figure 2D:
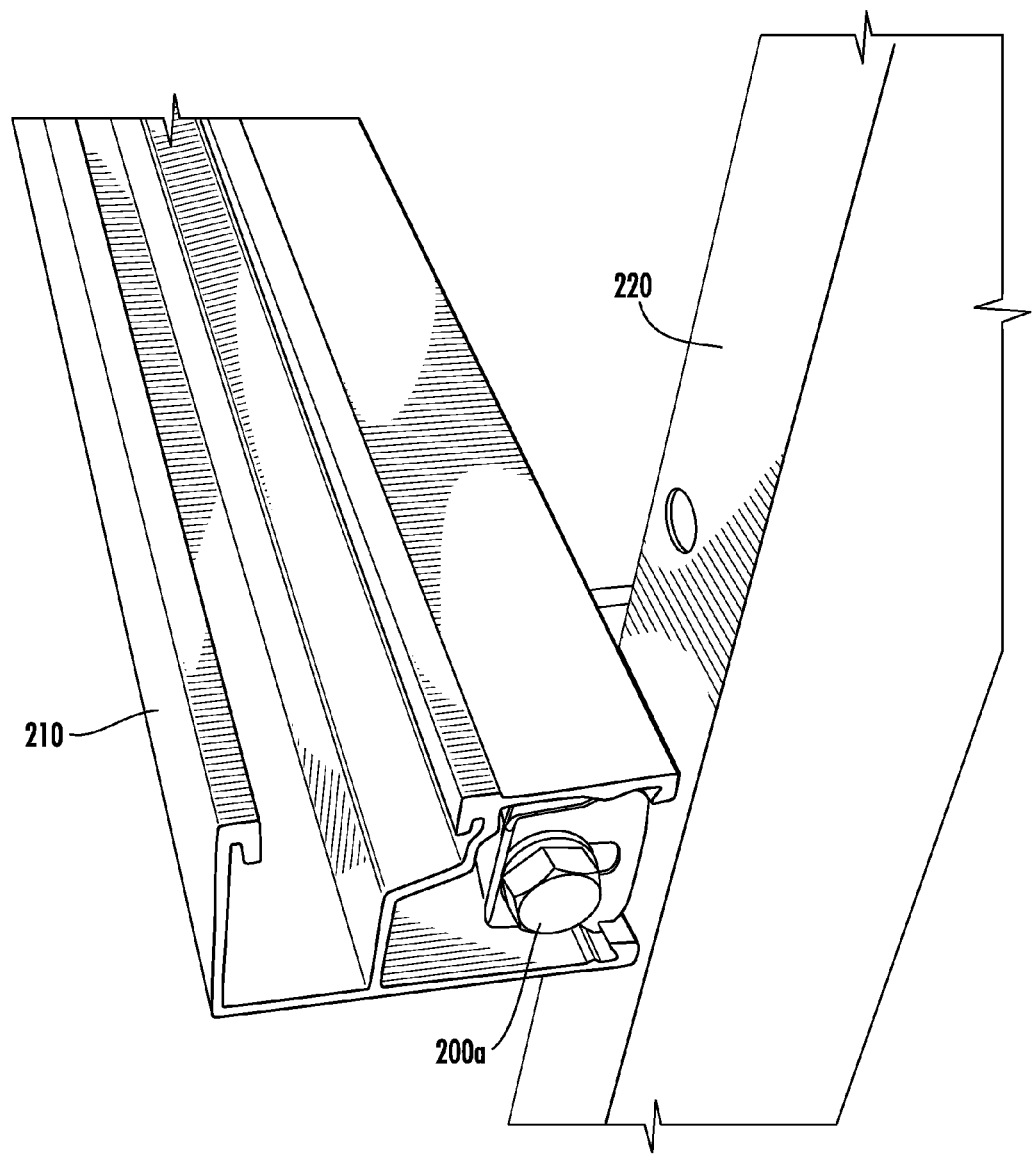
FIG. 2d shows a perspective view of a module end clamp in an installed position according to an exemplary embodiment.
Figure 2E:
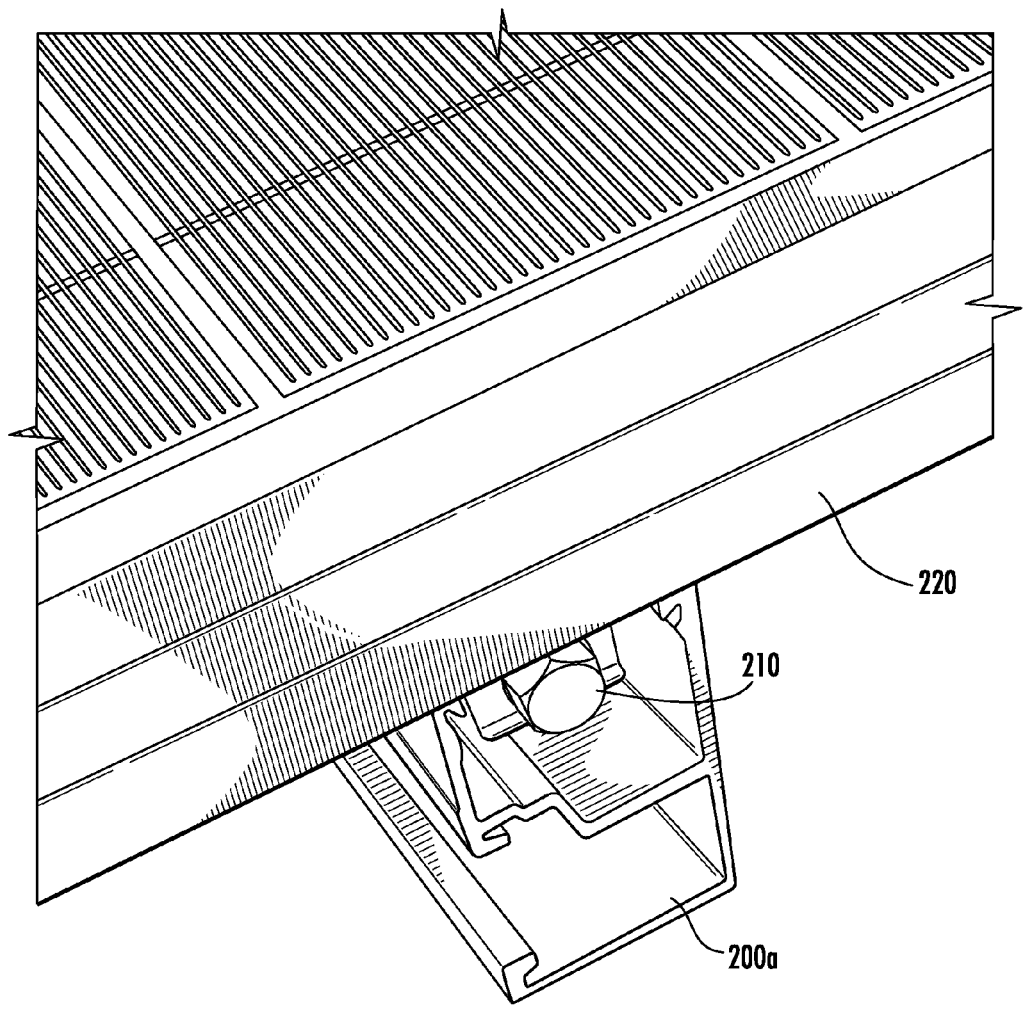
FIG. 2e shows a perspective view of a module end clamp in an installed position according to an exemplary embodiment.

FIGS. 2a to 2e show a perspective view of an installation of a clamp is shown according to another exemplary embodiment. As shown in FIG. 2a, a clamp 200 can be slid into an end of a channel in a rail 210 such that a head of a bolt 200a remains exposed to an installer. A clamp body 200b and a wedged channel nut 200c of the clamp 200 are configured to be received by the rail 210 having a standard configuration. As shown in FIGS. 2b and 2c, the installer can continue to slide the clamp 200 into the rail 210. As shown in FIG. 2d, once the clamp 200 has been slid a few centimeters into the rail 210, a module 220 can be positioned on the rail 210. The process to secure the module 220 to the rail 210 occurs similar to the method described above in FIGS. 1a to 1c, wherein the clamp 200 is tightened by bolt 200a to secure the module 220 to the rail 210. The bolt 200a remains visible and accessible to the installer, who can use a drill, screwdriver, pliers, wrench, or other tool to tighten the bolt 200a of the clamp 200. FIG. 2e shows a perspective view of an installed clamp 200.

Figure 3A:
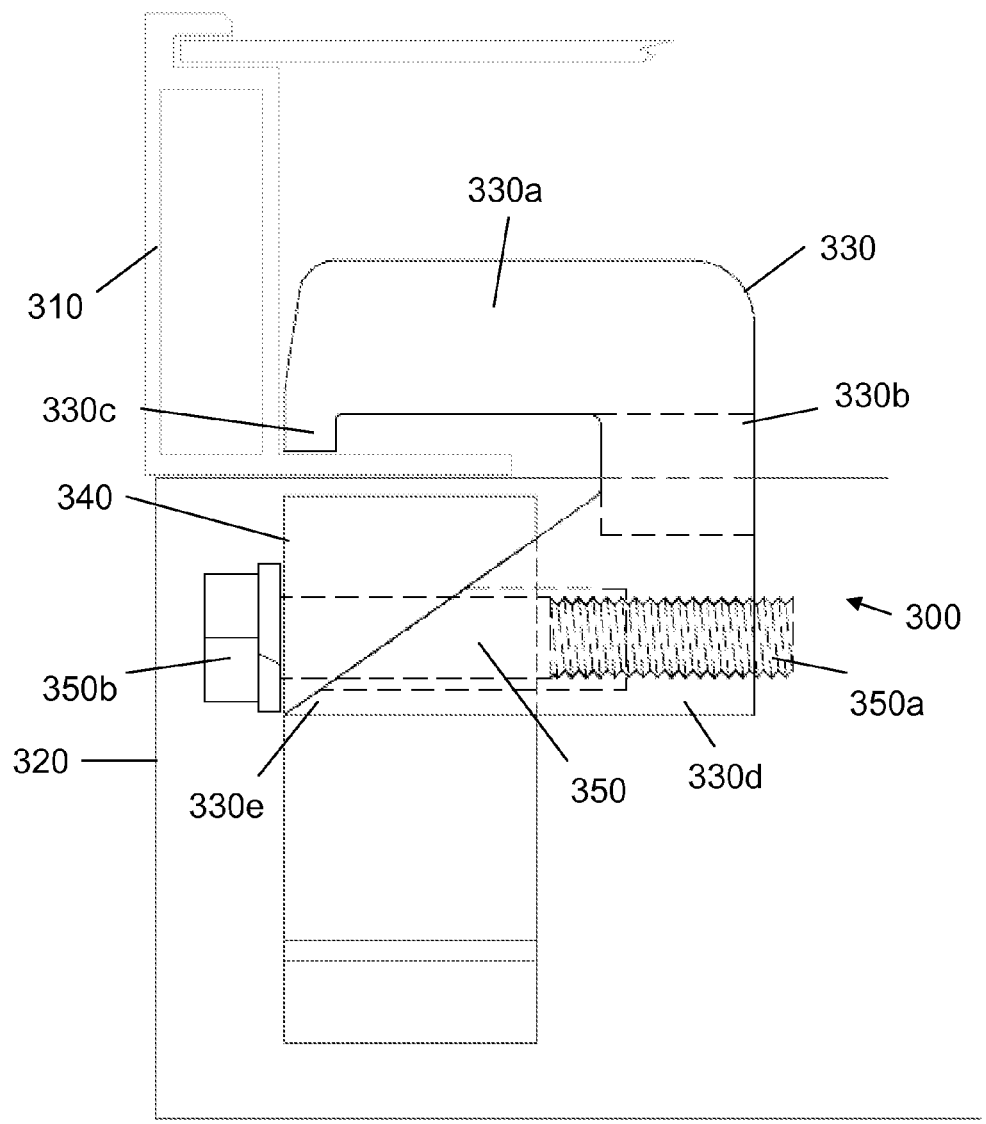
FIG. 3a shows a cross-sectional view of a universal module end clamp for a side-slot style rail according to an exemplary embodiment.
Figure 3B:
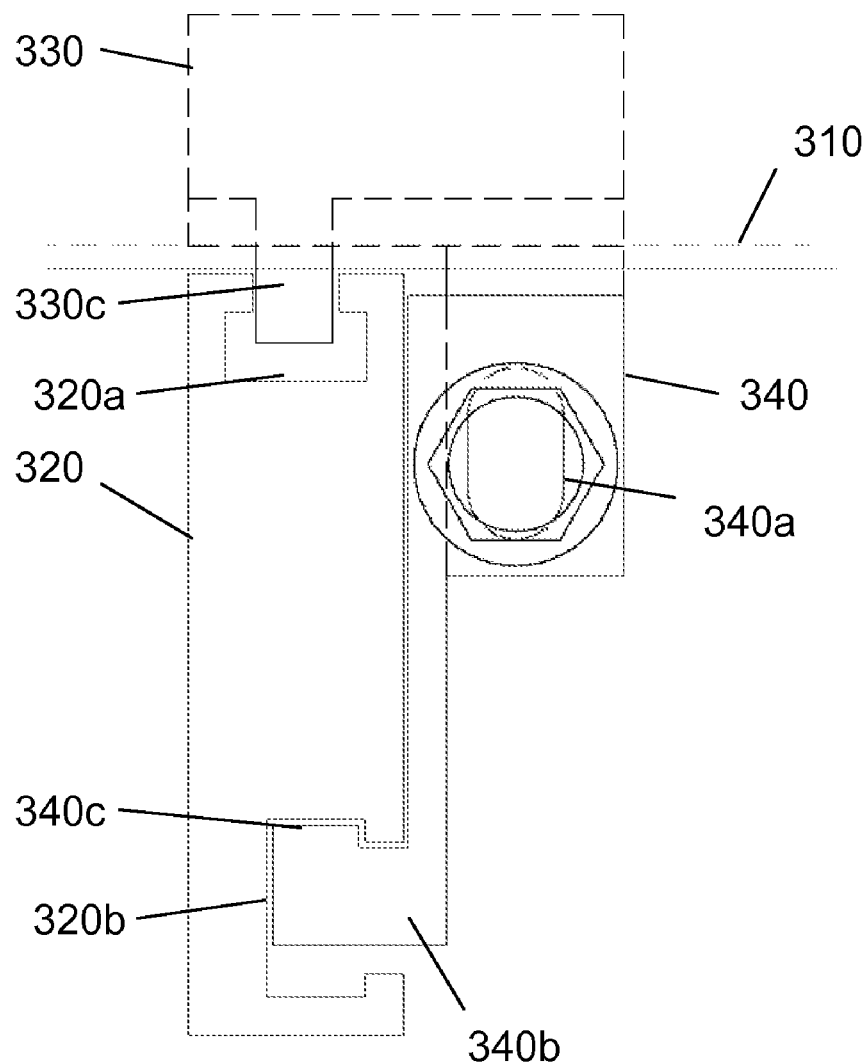
FIG. 3b shows a side view of a universal module end clamp for a side-slot style rail according to an exemplary embodiment.

FIGS. 3a and 3b show a module end clamp 300 configured for securing a module 310 to a side slot style rail 320. Similar to the module end clamp shown in FIGS. 1a to 1g, the module end clamp 300 has a body 330, a nut 340, and a bolt 350. The body 330 has a horizontal component 330a and a vertical component 330b extending perpendicular to the horizontal component 330a. At a distal end of the horizontal component 330a, the body 330 has a flange 330c extending downwardly and perpendicular from the horizontal component 330a. The vertical component 330b extends into a nut-receiving component 330d that extends outwardly in a direction away from the horizontal component 330a. In a direction parallel to the horizontal component 330a, the nut-receiving component 330d tapers to a point 330e.

The bolt 350 extends through the nut 340 and into the body 330. The body 330 has a threaded aperture for receiving a threaded component 350a of the bolt 350. The bolt 350 can engage or disengage the nut 340 and the body 330 by using torque to rotate a polygonal component 350b at a distal end of the bolt 350. It is intended that the bolt 350 can have any configuration at the distal end that allows a user to rotate the bolt or allows the bolt to engage or disengage, such as a screwdriver receiving recess, and is not limited to a polygonal component, such as a hexagonal or pentagonal shaped component. In this exemplary embodiment, when the bolt 350 is completely tightened, a distal end of the threaded component 350a can extend past the nut-receiving component 330d of the body 330.

Because the rail 320 is configured differently than the rail shown in FIGS. 1a to 1d, the nut 340 can also be configured differently. The rail 320 has a first slot 320a proximate to the module 310. The rail 320 has a second slot 320b in a side of rail 320 that extends perpendicularly away from module 310. The body 330 of the clamp 300 has a downward extending flange 330c that engages the first slot 320a when the bolt 350 is tightened. The nut 340 has an aperture 340a for receiving the bolt 350. The nut 340 also has a nut flange 340b that extends into the second slot 320b. A second nut flange 340c extends from the nut flange 340b toward a side of the second slot 320b. When the bolt 350 is tightened, the body 330 and the nut 340 engage each other as well as the rail 320 to secure the module 310.

Figure 4A:
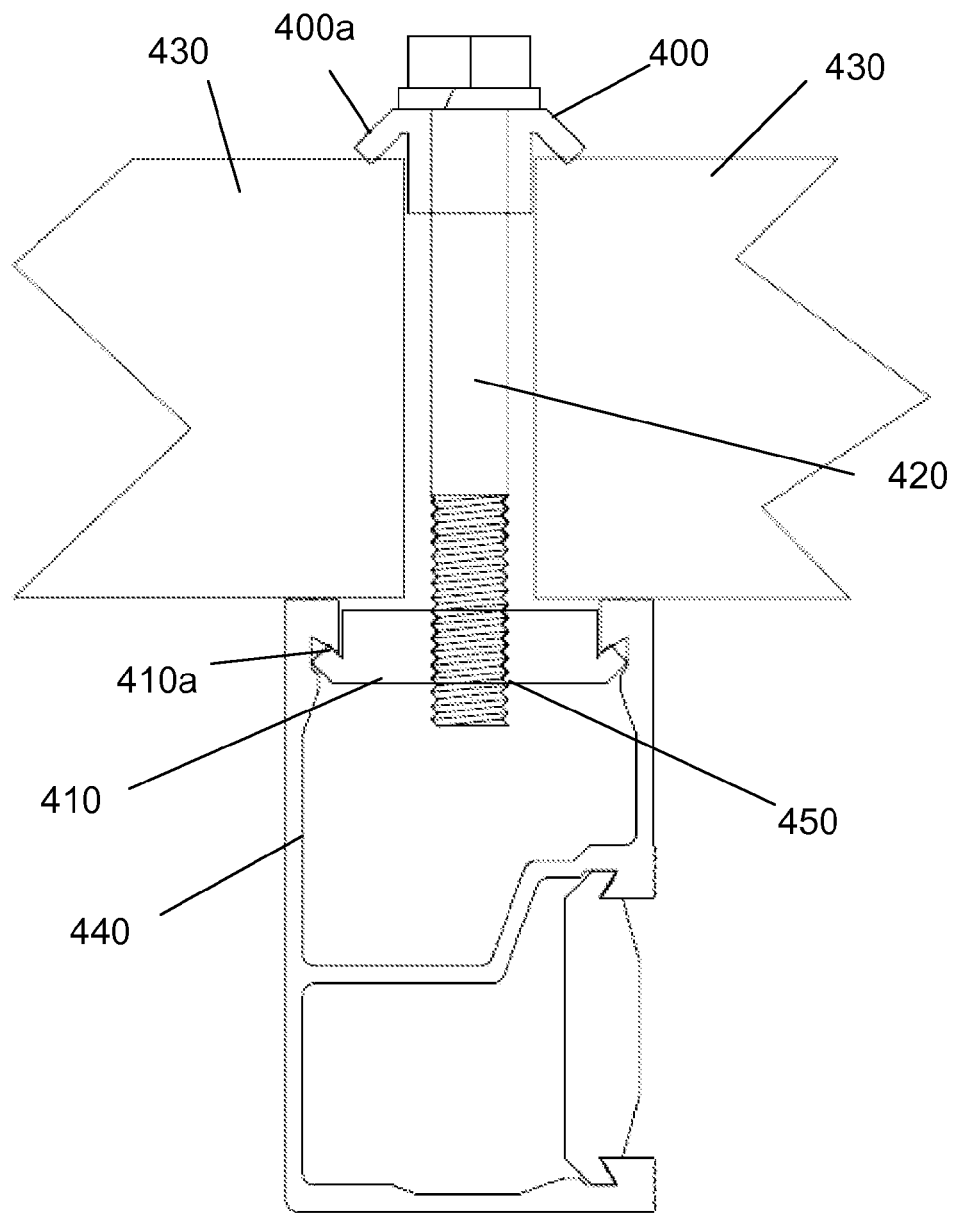
FIG. 4a shows a cross-sectional view of a grounding channel nut and mid clamp securing two modules to a parallel rail according to an exemplary embodiment.
Figure 4B:
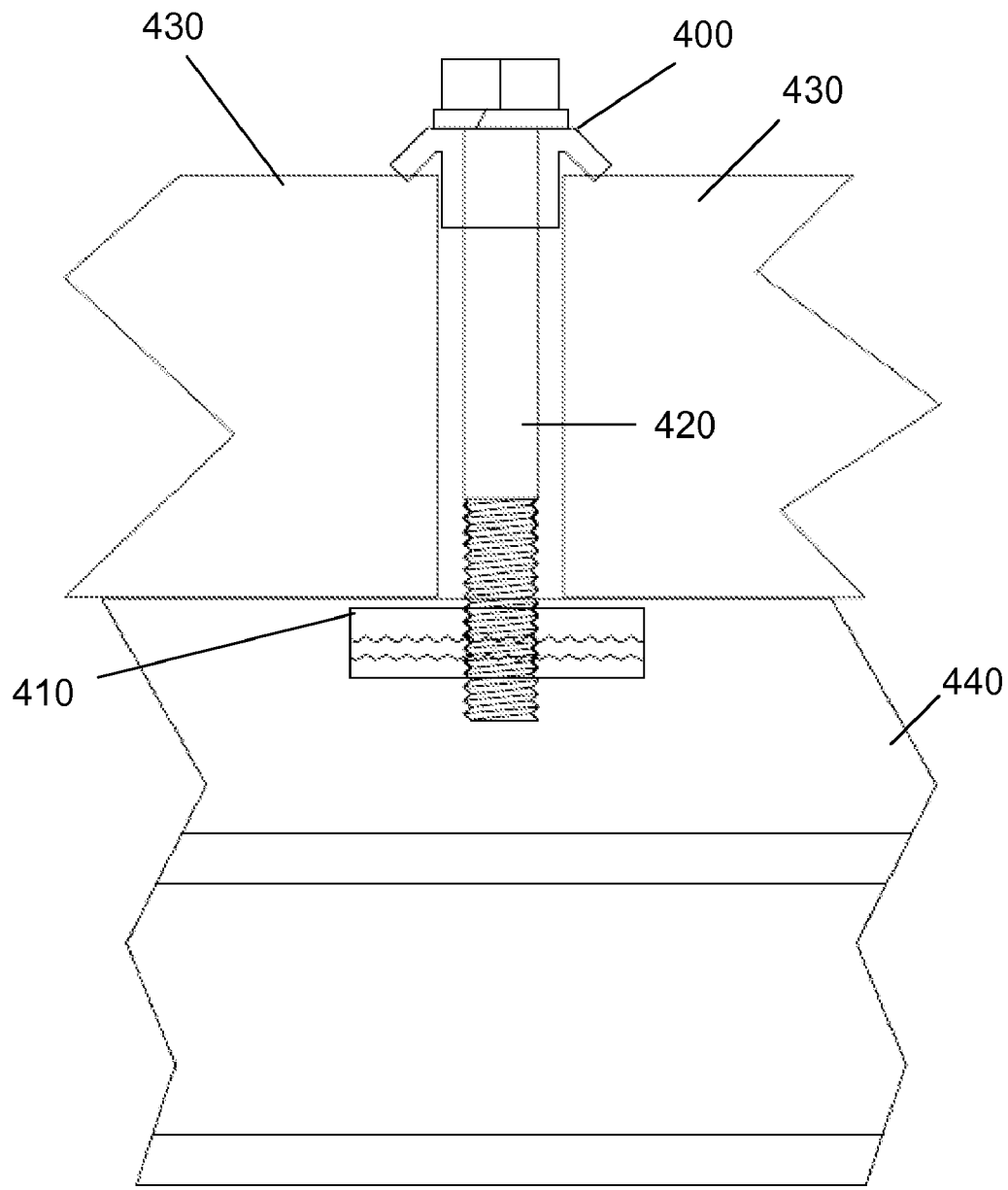
FIG. 4b shows a cross-sectional view of a grounding channel nut and mid clamp securing two modules to a perpendicular rail according to an exemplary embodiment.
Figure 4C:
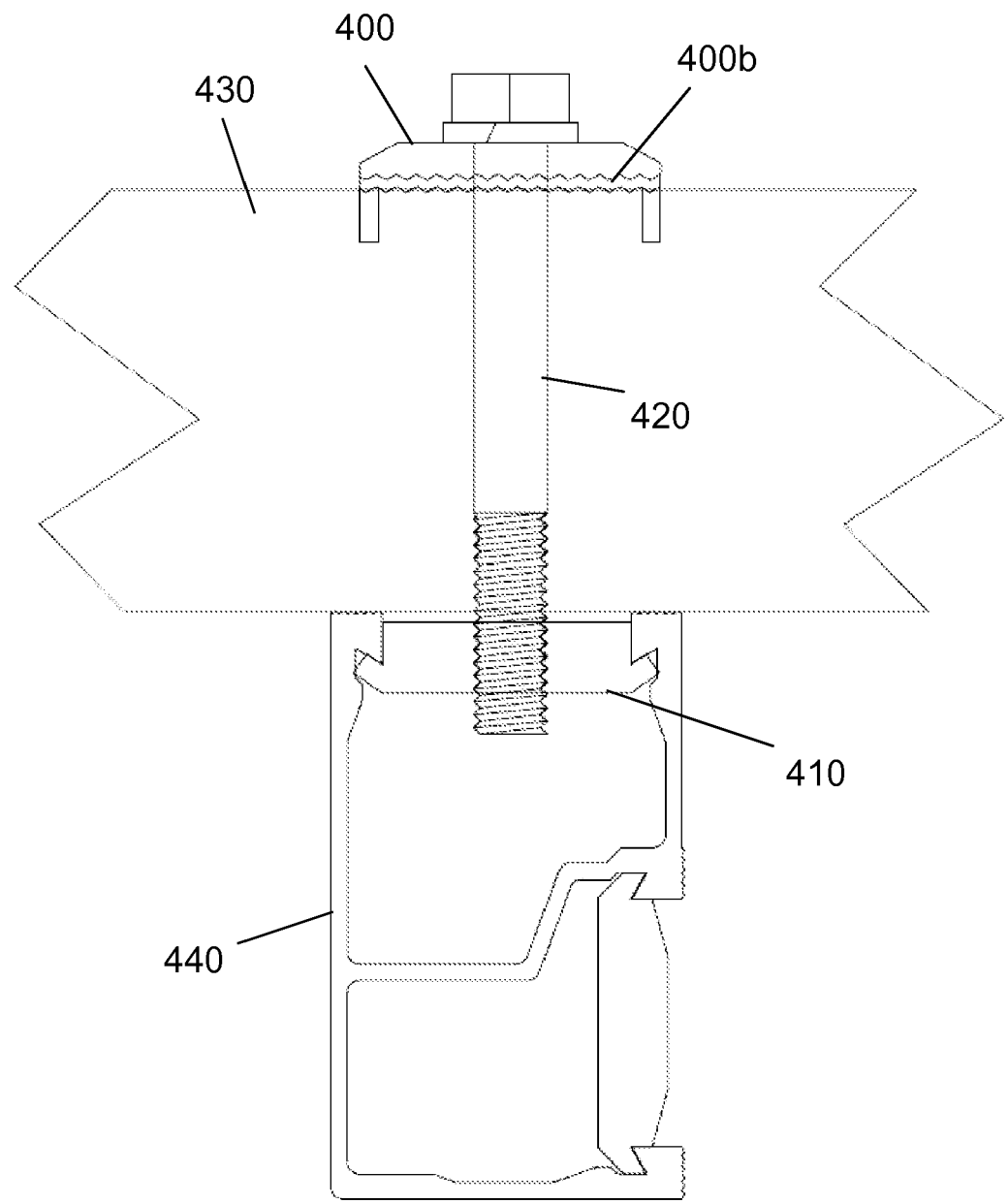
FIG. 4c shows a cross-sectional view of a grounding channel nut and mid clamp securing two modules to a perpendicular rail according to an exemplary embodiment.

FIGS. 4a to 4c show a cross-sectional view of a grounding mid clamp 400 secured to a grounding channel nut 410 according to an alternative exemplary embodiment. The mid clamp 400 receives a bolt 420 that extends from an upper end of the mid clamp 400, which is positioned above a module 430, and past the other end of the module 430 through the grounding channel nut 410. The grounding channel nut 410 can be secured in a rail 440 supporting the module 430. The mid clamp 400, bolt 420, and grounding channel nut 410 are preferably made from a conductive material that is harder than the module and rail materials (e.g., aluminum) and does not rust or oxidize, such as stainless steel.

The mid clamp 400 has teeth 400a that extend toward the module 430. As the bolt 420 is tightened, the teeth 400a can puncture an anodized aluminum module 430 to create an electrical ground path from the bolt 420.

The grounding channel nut 410 has teeth 410a extending in a substantially upward direction. When the bolt 420 is tightened, the grounding channel nut 410 moves in a direction closer to the mid clamp 400. The teeth 410a of the grounding channel nut 410 puncture the rail 440 to create an electrical ground path in the rail 440. Stainless PEM insert threads 450 can ensure electrical conductivity from the bolt 420 to the grounding channel nut 410.

As shown in FIG. 4a, the rail 440 runs in a direction substantially parallel to a seam between the two modules 430. However, the mid clamp 400 can also be used in a configuration where the rail 440 runs perpendicular to the seam between the two modules, as shown in FIGS. 4b and 4c. As further shown in FIG. 4c, the mid clamp 400 can have a saw-toothed edge 400b to grip the module 430. In one embodiment, the edge 400b can puncture the anodized aluminum module 430.

The various embodiments of a clamp and the components thereof described herein can be composed of any known or convenient material, including, but not limited to metal, fiberglass, plastic, wood, composites or any other combination of materials. The clamp can be manufactured by any process known in the art, including extrusion and cold-forging.

The embodiments described above are intended to be exemplary. One skilled in the art recognizes that numerous alternative components and embodiments that may be substituted for the particular examples described herein and still fall within the scope of the invention.

What is claimed is:

1. A clamp comprising:
    a body including:
        a first component extending from the body and configured to engage a module;
        a second component extending from the first component and configured to engage a first slot in a rail; and
        a third component having a tapered body surface;
    a nut including:
        a tapered nut surface having an angle substantially identical to the angle of the tapered body surface of the third component, wherein the tapered nut surface engages the tapered body surface; and
        a nut extension extending away from the body and having a nut flange configured to engage a second slot of the rail; and
    a bolt extending through the nut and configured to engage a threaded aperture of the body, wherein tightening of the bolt causes the third component of the body to slide against the tapered nut surface thus moving the first component towards the nut.

2. The clamp according to claim 1, wherein the nut flange comprises a second nut flange configured to engage a recess of the second slot of the rail.

3. The clamp according to claim 1, wherein the tightening of the bolt causes the nut flange to exert a force on the second slot of the rail in a direction toward the module.

4. A system comprising:
    a module;
    a rail comprising:
        a first slot formed in a first side of the rail proximate the module; and
        a second slot formed in a second side of the rail extending perpendicularly from the module; and
    a clamp comprising:
        a body comprising:
            a first component configured to engage the module;
            a second component extending from the first component and configured to engage the first slot; and
            a third component comprising a tapered body surface;
        a nut comprising:
            a tapered nut surface comprising an angle substantially identical to the angle of the tapered body surface of the third component, wherein the tapered nut surface engages the tapered body surface; and
            a nut extension comprising a nut flange configured to engage the second slot; and
        a bolt extending through the nut and configured to engage a threaded aperture of the body, wherein tightening of the bolt causes the third component of the body to slide against the tapered nut surface thus clamping the first component onto the module.

5. The system according to claim 4, wherein the nut flange comprises a second nut flange configured to engage a recess of the second slot of the rail.

6. The clamp according to claim 4, wherein the tightening of the bolt causes the nut flange to exert a force on the second slot of the rail in a direction toward the module.

* * * * *